US006935704B2

(12) United States Patent
Guimard et al.

(10) Patent No.: US 6,935,704 B2
(45) Date of Patent: Aug. 30, 2005

(54) VEHICLE WHEEL WITH ASSEMBLY UNDER THE RIM SEAT

(75) Inventors: Bruno Guimard, Chamalieres (FR); Denis Alff, Riom (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 10/331,927

(22) Filed: Dec. 30, 2002

(65) Prior Publication Data

US 2003/0141754 A1 Jul. 31, 2003

Related U.S. Application Data

(63) Continuation of application No. PCT/EP01/07226, filed on Jun. 25, 2001.

(30) Foreign Application Priority Data

Jun. 29, 2000 (FR) .............................................. 00 08449

(51) Int. Cl.[7] .............................................. B60B 3/00
(52) U.S. Cl. ................................ 301/63.101; 301/64.1; 301/95.701
(58) Field of Search ........................... 301/63.1, 63.101, 301/63.103, 63.106, 64.1, 64.202, 64.203, 95.101, 95.108; 29/894.323, 894.325, 894.324, 894.32, 894.322, 894

(56) References Cited

U.S. PATENT DOCUMENTS

| 5,295,304 A | | 3/1994 | Ashley, Jr. | |
|---|---|---|---|---|
| 5,345,676 A | | 9/1994 | Ashley, Jr. | |
| 5,577,810 A | | 11/1996 | Abe et al. | |
| 5,647,126 A | * | 7/1997 | Wei ........................ | 29/894.322 |
| 5,694,687 A | | 12/1997 | Coleman | |
| 6,073,347 A | * | 6/2000 | Cvijanovic et al. .... | 29/894.323 |
| 6,282,788 B1 | * | 9/2001 | Politi et al. ............ | 29/894.323 |

FOREIGN PATENT DOCUMENTS

| EP | 464449 A1 | * | 1/1992 | ........... B21D/53/26 |
|---|---|---|---|---|
| EP | 0761476 | | 3/1997 | |
| EP | 761476 A1 | * | 3/1997 | ............. B60B/3/04 |
| FR | 2555115 | | 4/1983 | |
| FR | 0464449 | | 1/1992 | |
| GB | 2108059 | | 5/1983 | |
| GB | 2108059 A | * | 5/1983 | ............. B60B/3/04 |
| WO | 9851518 | | 11/1998 | |
| WO | 9933594 | | 7/1999 | |
| WO | WO 9933594 A1 | * | 7/1999 | ........... B21D/53/30 |

* cited by examiner

*Primary Examiner*—Frantz F. Jules
(74) *Attorney, Agent, or Firm*—Burns, Doane, Swecker & Mathis, LLP

(57) ABSTRACT

Wheel for an automobile, in which assembly between the sheet metal disc and the wheel rim is effected under the outer seat of the rim by cylindrical fitting.

The profile of the rim may be obtained by a flow spinning process.

21 Claims, 8 Drawing Sheets

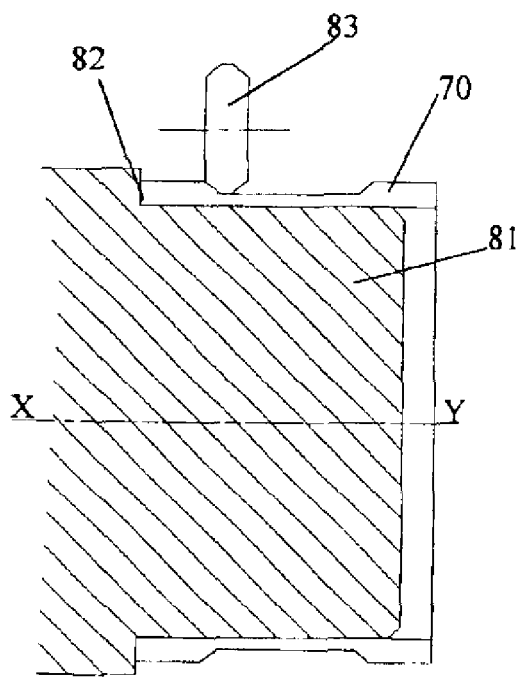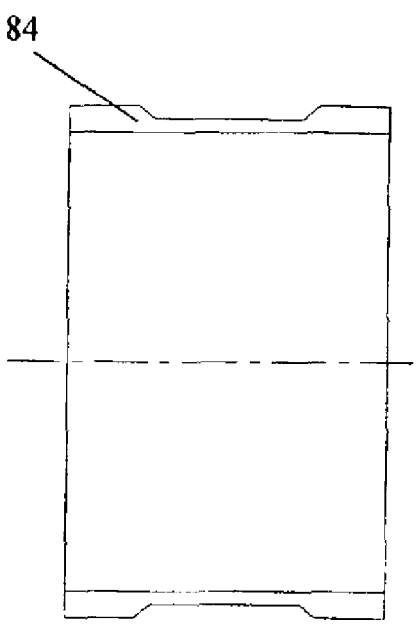
Fig. 12                    Fig. 13
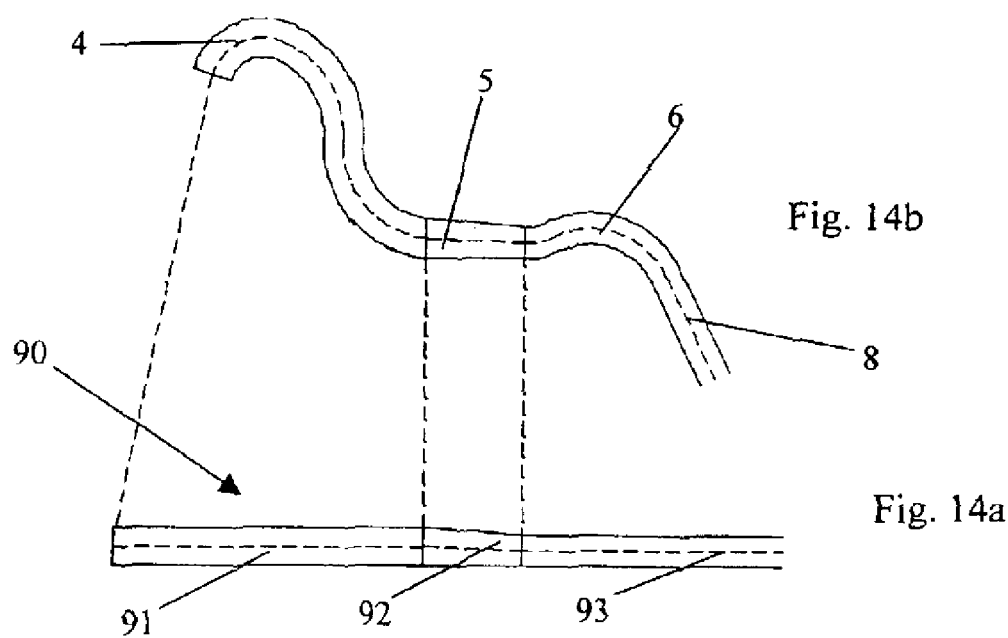
Fig. 14b
Fig. 14a

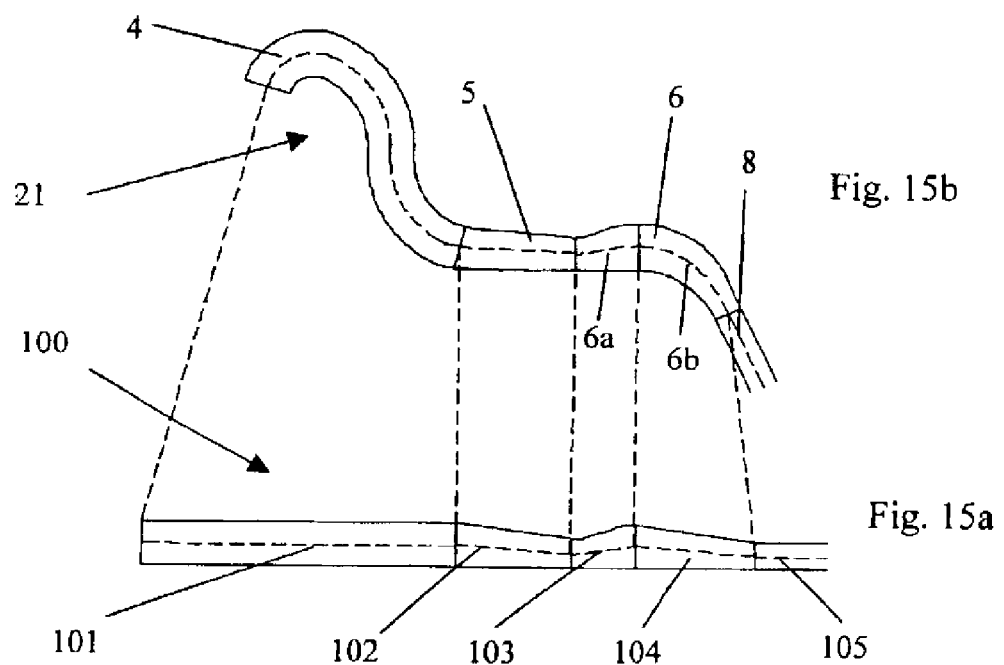
Fig. 15b
Fig. 15a
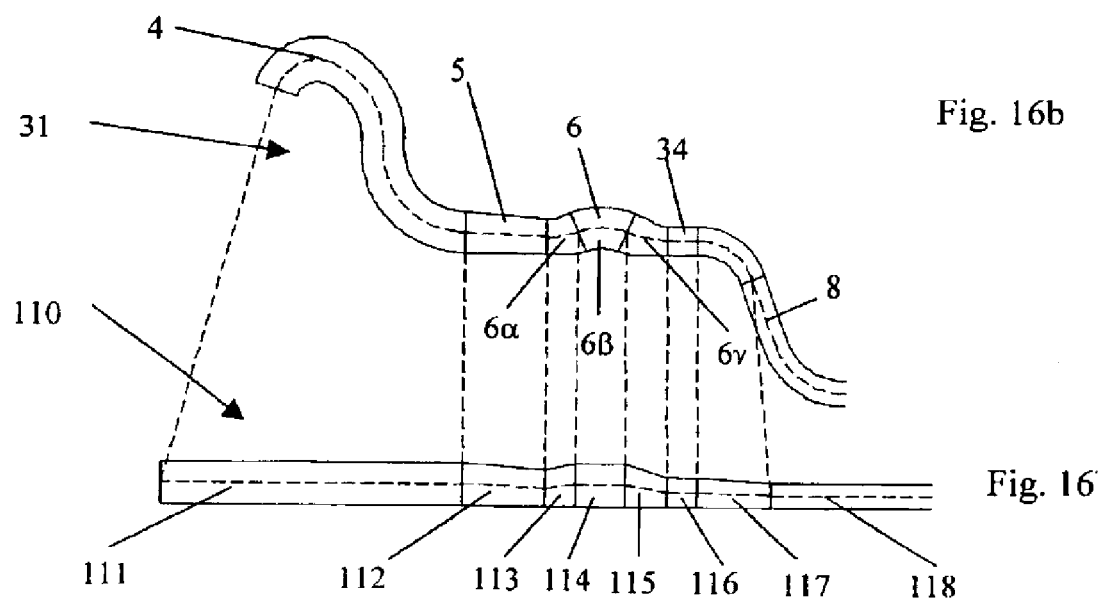
Fig. 16b
Fig. 16

VEHICLE WHEEL WITH ASSEMBLY UNDER THE RIM SEAT

CROSS REFERENCE TO RELATED APPLICATIONS

This application is a continuation of PCT/EP01/07226, filed on Jun. 25, 2001, which was published in French as international application WO 02/00450 on Jan. 3, 2002 and which claims priority of French application 00/08449 filed Jun. 29, 2000.

BACKGROUND OF THE INVENTION

1. The Field of the Invention

The present invention relates to a wheel for vehicles and in particular to a vehicle wheel comprising a disc and a rim made from sheet metal, which is assembled under the outer rim seat.

2. The Related Art

Patent EP 0 464 449 relates to a wheel comprising a sheet metal rim with an outer and an inner rim flange, an outer rim seat with a radially outer frustoconical wall and an inner rim seat, a mounting groove, a disc with a hub bearing surface, a radially outer edge designed for assembly with the rim, and a connection zone, the assembly between the rim and the disc being carried out between the radially inner wall of the outer rim seat and the radially outer wall of the edge of the disc. The connection between the disc and the rim consists of a continuous weld bead between the disc and the rim on the axially outer side, and such that the weld bead has undergone a finishing operation by removal of material so that the surface condition of the weld bead ensures visual continuity of shape between the disc and the rim. The visual impression produced by such a wheel is similar to that of a "full-face" wheel, in which the disc is continuous as far as the outer rim flange of the rim. Such a full face wheel is shown, for example, in FIG. 11 of WO 99/33594.

The assembly between the disc and rim of such a wheel is carried out by fitting together two conical zones: the radially inner wall of the outer rim seat and the radially outer wall of the disc's assembly edge. To ensure good strength of the joint between the disc and the rim, it is important to control the tightening force between the disc and the rim. "Tightening force" means the complex of forces developed between the touching portions of the disc and rim during fitting, which are due to the varying diameters of the two walls in contact.

Since this assembly is carried out between conical components, tightening is a direct function of the amount by which the rim is off-center, i.e., the distance between the axial position of the median plane of the rim and the bearing surface of the disc. Consequently, conical fitting makes it complicated to control the amount by which the wheel is off-center and the degree of tightening, both at the same time and under industrial manufacturing conditions.

SUMMARY OF THE INVENTION

The object of the present invention is to provide an automobile wheel that comprises a sheet metal rim having an outer rim flange and an inner rim flange, an outer rim seat with a radially outer frustoconical wall inclined at an angle α relative to the wheel's rotation axis, an inner rim seat and a mounting groove, and a disc of sheet metal with a hub bearing surface, a radially outer edge designed for assembly with the rim, and a connection zone, the assembly between the rim and the disc being carried out between the radially inner wall of the outer rim seat and the radially outer wall of the edge of the disc. The wheel is characterized in that the radially outer edge of the disc and the radially inner edge of the outer seat of the rim are cylindrical.

One advantage of the wheel of the present invention is that assembly between the disc and the rim takes place under the outer rim seat between two cylindrical walls of the rim and the disc, so that the tightening intensity between the disc and the rim is independent of the amount by which the rim is off-center. It is, therefore, much easier to exercise convenient control over the industrial manufacturing conditions of such a wheel.

In one embodiment, the radially outer edge of the disc extends axially a distance that is essentially the same as the axial width of the outer rim seat. This allows good endurance of the joint to be obtained.

In another embodiment, when the outer rim seat is adjacent to a safety boss or hump, the radially outer edge of the disc extends axially a distance that is essentially equal to the axial width of the outer rim seat increased by whole or part of the axial width of the safety hump.

When the rim includes a cylindrical transition zone between the outer side-wall of the mounting groove and the safety hump, the contact zone between the disc and the rim extends axially beyond the rim seat over all or part of the radially inner wall of the cylindrical transition zone. These last two embodiments increase the axial length of the contact zone between the disc and the rim, thereby reinforcing the fatigue strength of the joint.

The curvature of the outer edge of the disc may be orientated axially towards the inside or the outside of the rim.

The wheels according to the invention may have a disc made from steel or aluminum sheet made by stamping. Since fitting is carried out between two cylindrical zones, the process of making the discs is simplified in that a machining operation, previously needed in order to obtain the conical fitting zone, is now no longer necessary.

In one embodiment, the joint between the disc and the rim may be made by spot welding at points arranged at regular intervals circumferentially, and axially essentially in the middle of the outer rim seat.

A further object of the invention is to provide a wheel of the "full-face" type for an automobile, comprising a sheet metal rim having, axially from the inside outwards, an inner wheel flange, an inner seat, a mounting groove, and at least part of the outer seat with a radially outer frustoconical wall inclined at an angle α relative to the wheel's rotation axis, a disc with a hub bearing surface, a transition zone ending radially in an outer rim flange, and a shoulder extending axially inwards and whose radially external wall is designed to constitute, together with the radially inner wall of the outer end of the outer rim seat, the assembly zone of the disc with the rim, characterized in that the two assembly surfaces of the disc and the rim have cylindrical geometry.

This wheel has the same advantage as the wheel with assembly under the rim seat described above, namely that of having cylindrical fitting surfaces that allow good control of the tightening between the disc and the rim and of the amount by which the rim is axially off-center relative to the disc.

Advantageously, the thickness variation between the radially outer frustoconical wall and the radially inner cylindrical wall of the outer seat or of the outer portion of the rim seat of the wheels according to the invention, is produced by a flow spinning operation.

Preferably, the thickness of the rim or portion thereof is smaller in the zone between the outer side-wall of the mounting groove and the inner rim flange compared with the thickness of the other parts of the said rim, and this thickness variation is produced by flow spinning operations.

The use of a rim with these thickness variations allows the weight of the rim to be reduced substantially without limiting its mechanical endurance. Weights essentially comparable to those of wheels assembled under the mounting groove can be obtained in this way.

A further object of the invention is a process for the production of a vehicle wheel in which:

a wheel rim is made from sheet metal by carrying out the following steps:
  a plate of sheet metal is cut out to obtain rectangular geometry;
  the plate is bent to produce a cylindrical sleeve;
  the two free edges of the sleeve are welded together;
  at least one cylindrical flow spinning operation is carried out to obtain a given thickness profile of the sleeve, in particular comprising in the zone intended to constitute the outer seat an angle of inclination α relative to the axial direction;
  the sleeve is then shaped to obtain the rim, in particular with a radially inner cylindrical wall in the zone of the outer seat and with a radially outer frustoconical wall inclined at an angle α corresponding to the standard inclination of the rim seats of the said rim; and
  the said rim is then calibrated;
a disc is made, having an assembly edge whose radially outer surface has cylindrical geometry;
the said rim and the said disc are assembled by fitting together under the outer seat of the rim; and
the said assembly is welded together.

The disc may be made by stamping out from a metal plate, with flattening of the outer edge to obtain a cylindrical assembly edge. It may also be obtained by casting.

Preferred embodiments of the invention will be described to illustrate its principles, but the invention can be implemented in many other possible ways.

BRIEF DESCRIPTION OF THE DRAWINGS

FIGS. 10 to 16 illustrate various stages in the process for producing a wheel according to the invention with flow spinning operations.

DESCRIPTION OF EXEMPLARY EMBODIMENTS

Figure 1:
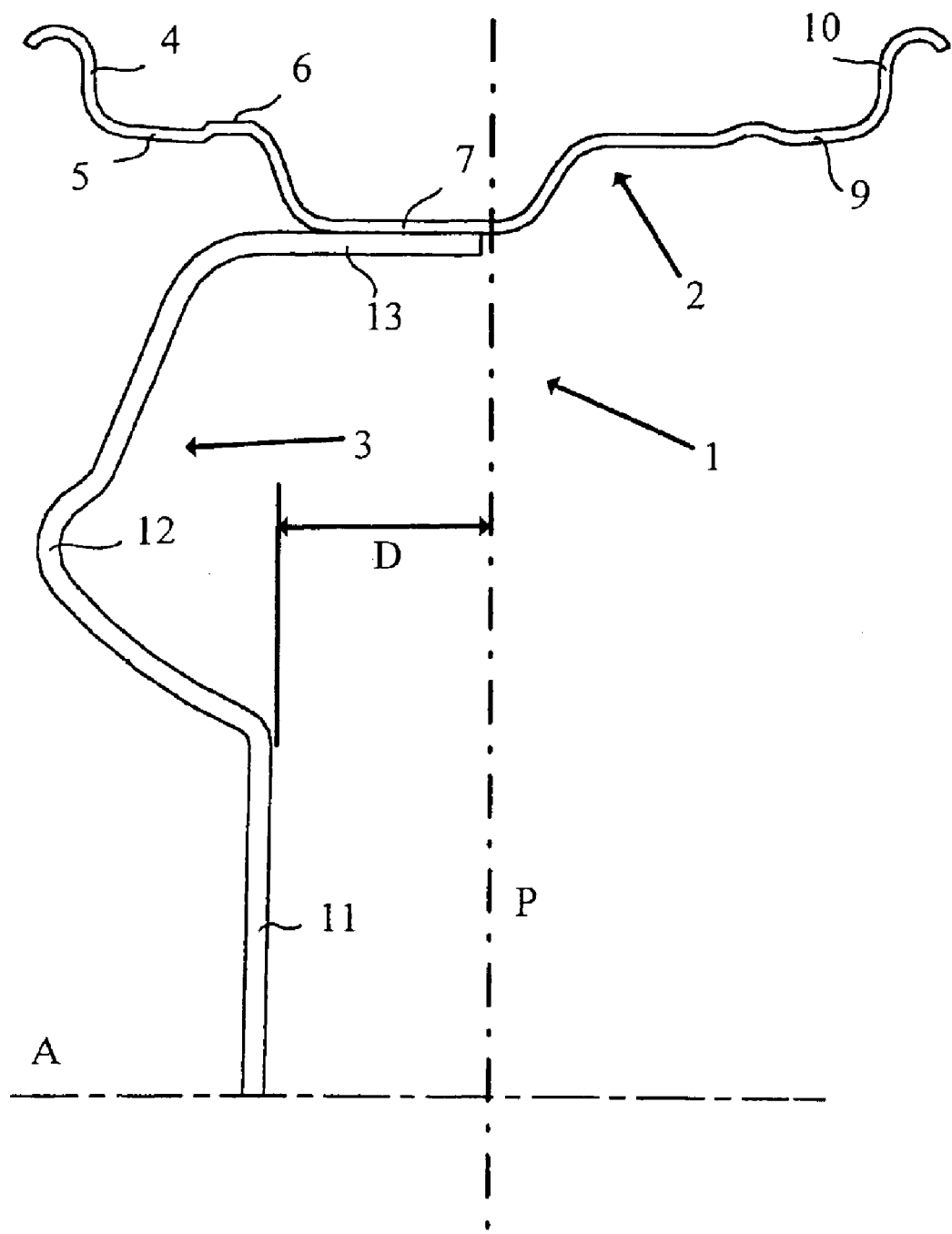
FIG. 1 is a partial cross-section of an ordinary wheel with assembly under the mounting groove.

FIG. 1 shows a partial cross-section of an ordinary wheel made from steel sheet. This wheel 1 comprises a rim 2 and a disc 3. The figure shows the median plane of the wheel, namely the plane P. This plane is located an equal distance from the two flanges (4, 10) of the rim. The axially inner and outer positions are defined taking the median plane P as reference.

The rim has an outer rim flange 4, an outer rim seat 5, a safety boss or hump 6, a mounting groove 7, an inner seat 9 and an inner flange 10. The disc comprises a hub bearing surface 11, a transition zone 12 and an assembly edge 13. Assembly is carried out by fitting under the mounting groove 7.

The figure also shows the rotation axis A and the off-center distance D, namely the distance between the axially inner surface of the hub bearing surface 11 and the median plane P.

In what follows, the same index numbers will be used for similar parts of the wheels according to the invention.

Figure 2:
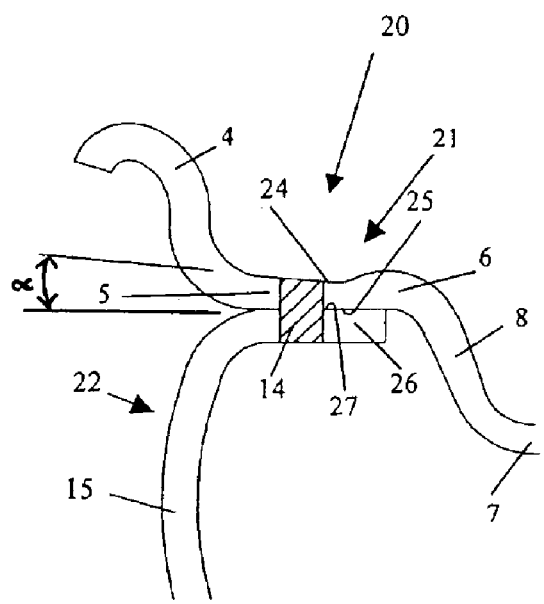
FIG. 2 is a partial cross-section of a first embodiment of the invention, illustrating the disc/rim fitting zone and spot welding.

FIG. 2 shows a schematic partial section of a first embodiment of a wheel 20 according to the invention. This wheel 20 comprises a rim 21 and a disc 22. In particular, the rim 21 has an outer flange 4, an outer seat 5, a safety boss or hump 6, a mounting groove 7 and an outer side-wall 8 of the groove 7. The seat 5 has a radially outer wall 24 and a radially inner wall 25. The wall 24 is inclined at an angle α relative to the rotation axis A of the wheel, α corresponding to the values standardized by ETRTO, namely usually 5° for passenger cars. The disc 22 has a transition zone 15 and an assembly edge 26. The assembly edge 26 of the disc 22 and the radially inner wall 25 of the rim 21 are cylindrical. This shape greatly facilitates the conditions in which the disc is fitted under the outer seat 5 of the rim. To ensure good tightness between the disc 22 and the rim 21, before assembly the diameter of the radially outer wall 27 of the assembly edge 26 of the disc 22 is slightly larger than that of the radially inner wall 25 of the seat 5. The permanence of the joint between the disc 22 and the rim 21 is ensured by spot welds such as the one shown at 14. The spot welds 14 are located axially essentially in the middle of the outer seat 23, and are distributed regularly around the circumference.

The rim 21 of the wheel 20 has a safety hump 6 whose outer surface is toroidal but whose radially inner surface is cylindrical in the extension of the fitting surface 25 of the outer seat 5 of the rim 21. The assembly edge 26 of the disc 22 extends axially under all or part of the safety hump 6. Assembly between the disc 22 and the rim 21 of this wheel 20 is carried out such that the curvature of the assembly edge 26 of the disc 22 faces towards the inside of the wheel 20.

Figure 3:
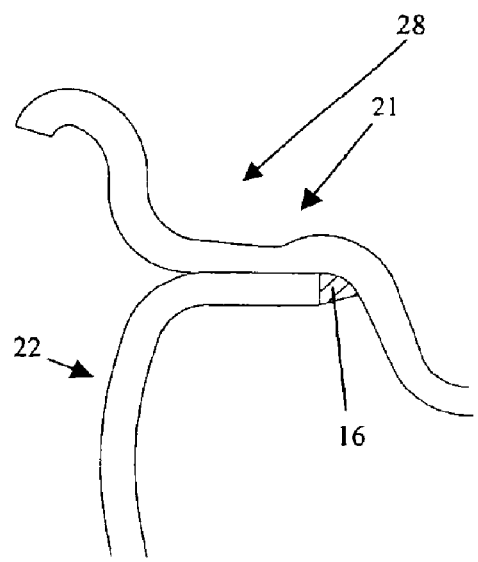
FIG. 3 is a section similar to that of FIG. 1 with a seam weld.

FIG. 3 shows a schematic partial section of a wheel 28 similar to wheel 20. The joint between the disc 22 and the rim 21 of the wheel 28 is ensured by a seam weld 16. This seam weld 16 may be continuous or discontinuous.

Figure 4:
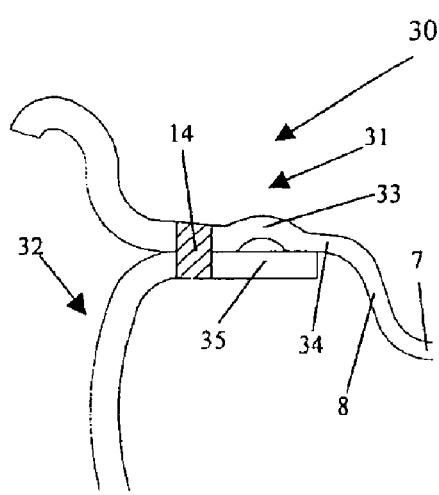
FIG. 4 illustrates a second embodiment of the invention, with spot welds.

FIG. 4 shows a wheel 30 comprising a rim 31 and a disc 32. Between the side-wall 8 of the mounting groove 7 and the safety hump 33 there is a cylindrical transition zone 34. The assembly edge 35 of the disc 32 extends axially on the inside over all or part of the transition zone 34. This reinforces the mechanical stability of the assembly between the disc and the rim, and so too its endurance in service. In this embodiment the safety hump 33 has a radially inner wall which is also toroidal, and so has essentially constant thickness. The wheel 30 is spot welded at points 14.

Figure 5:
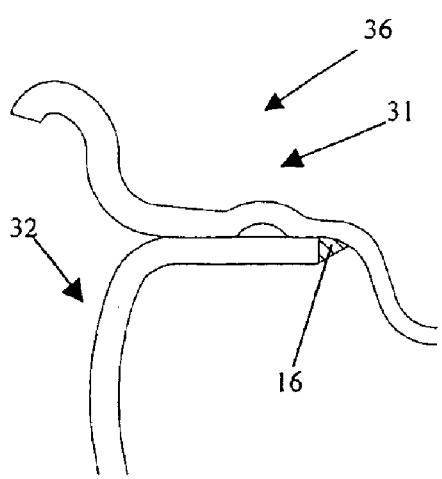
FIG. 5 is a section similar to that of FIG. 4, with a seam weld.

FIG. 5 shows a schematic partial section of a wheel 36 similar to the wheel 30. The joint between the disc 32 and the rim 31 of this wheel 30 is ensured by a weld seam 16. The weld seam 16 may be continuous or discontinuous.

Figure 6:
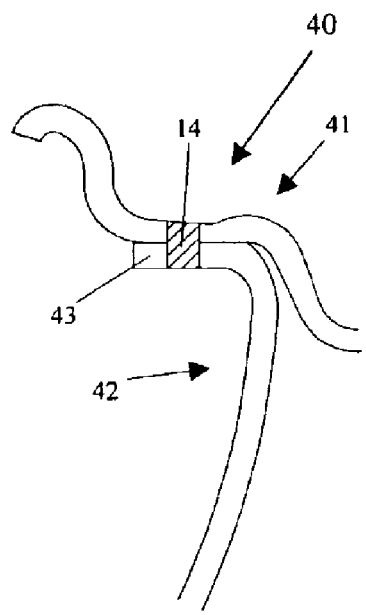
FIGS. 6 and 7 are schematic illustrations of a third embodiment of the invention with spot welds or a seam weld, respectively.
Figure 7:
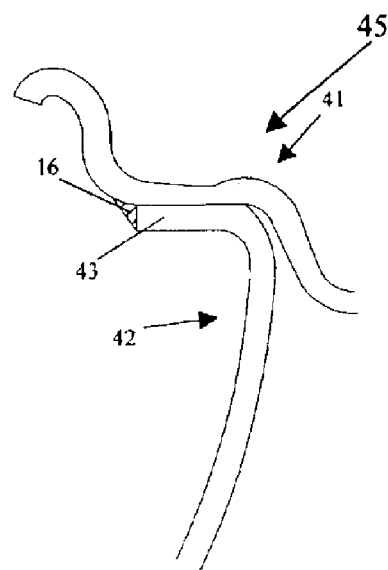

FIGS. 6 and 7 show similar sections of wheels 40 and 45 in which the assemblies between the discs 42 and the rims 41 are formed such that the curvature of the assembly edges 43 of these wheels, after assembly, faces towards the outside of the wheel. This mode of assembly gives the wheels 40 and 45 a particular appearance and makes it possible to obtain a mechanically optimized disc profile. The wheel 40 is spot welded at points 14 and the wheel 45 is seam welded at 16.

Figure 8:
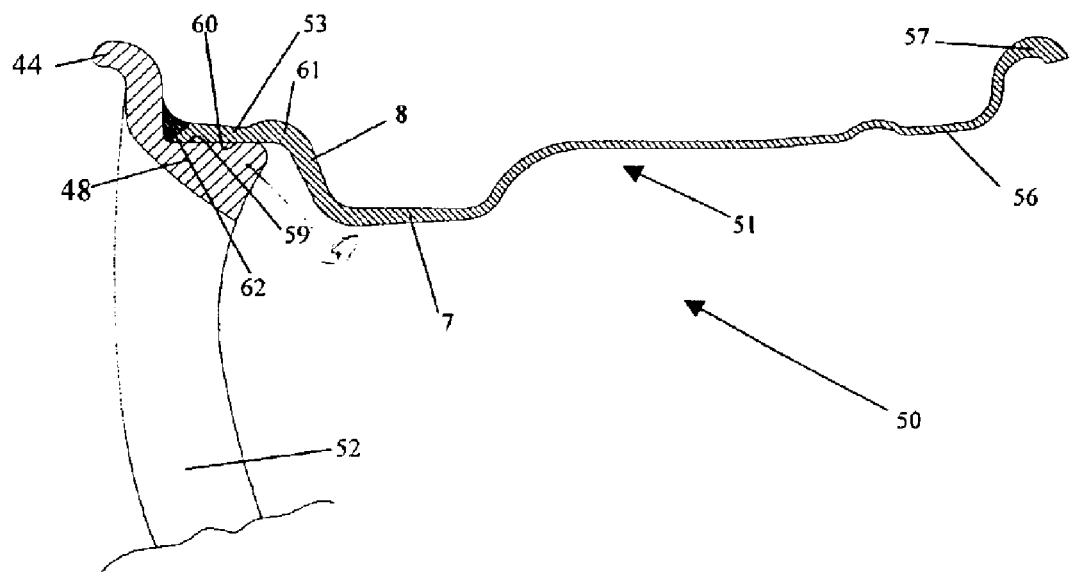
FIGS. 8 and 9 are schematic illustrations of a fourth embodiment of the invention in the case of a "full-face" wheel.
Figure 9:
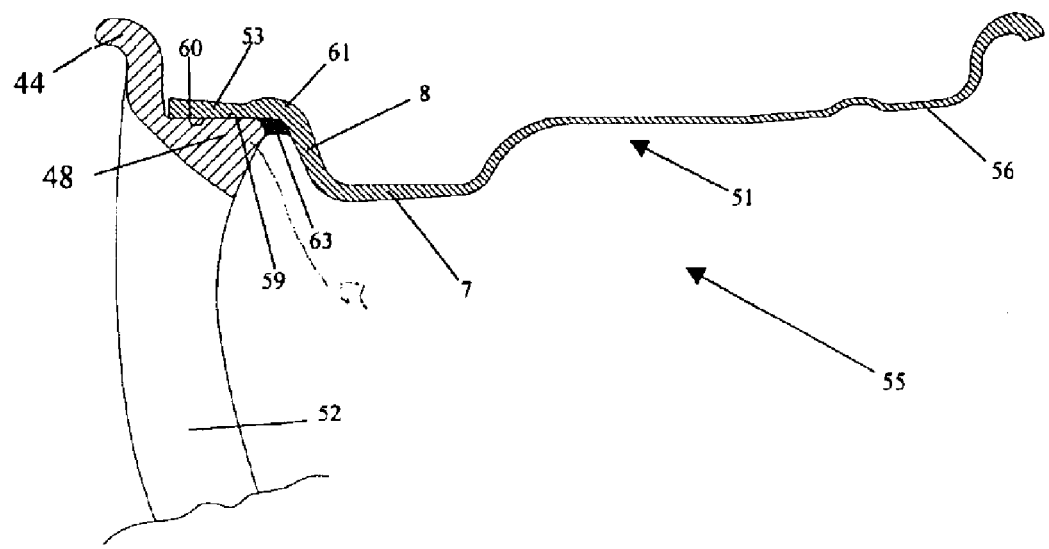

FIGS. 8 and 9 show another embodiment of a wheel according to the invention. The wheels 50 and 55 have a rim 51 ending axially on the outside essentially at the end of the outer seat 53. The outer rim flange 44 is an integral part of the disc 52. The disc 52 comprises axially on the inside a shoulder 58 whose radially outer wall 59 is cylindrical with a diameter adapted to co-operate with the radially inner wall 60 of the outer seat 53, the latter also being cylindrical, to form a cylindrical fit between the disc 52 and the rim 51. The wheels 50 and 55 both have seam welds. In FIG. 8, the seam weld 62 is made radially outside the end of the outer seat 53, while, in FIG. 9, the seam weld 63 is made radially inside the axially inner end of the shoulder 58, under the safety hump 61. The disc 52 is preferably made by casting an aluminium alloy.

The rim 51 consists of a metal sheet with variable thickness. The outer seat 53 has variable thickness in order to give its outer wall an inclination which conforms to the ETRTO standard, while its inner wall 60 is of constant diameter, this diameter being slightly smaller than that of the corresponding wall 59 of the shoulder 58 of the disc 52. The cross-section of the rim 51 has a variable thickness appropriate for the types of stresses imposed on the wheel. Its thickness decreases progressively from the outer side-wall 8 of the mounting groove 7 as far as the inner seat 56. The thickness of the sheet metal of the rim 51 increases from the end of the inner seat 56 as far as the end of the inner rim flange 57. These thickness variations ensure a substantial weight reduction without limiting the endurance of the wheels in service.

Figure 10:
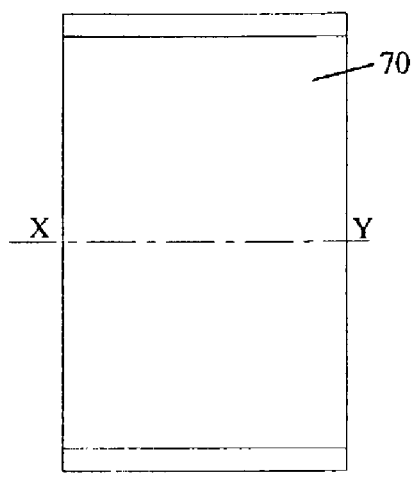
Figure 11:
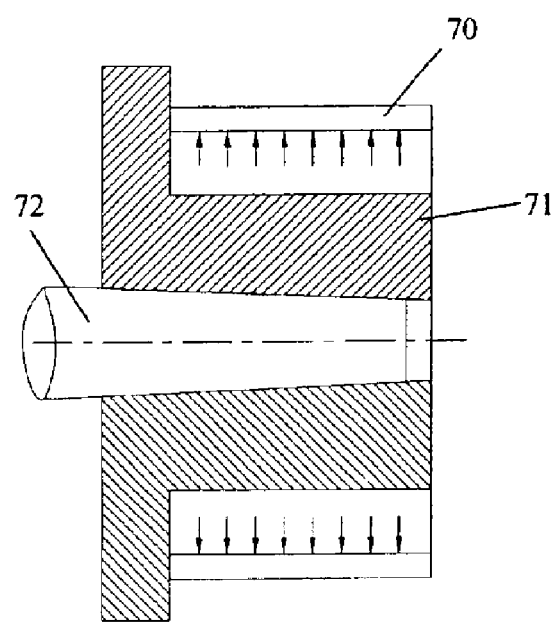
Figure 17:
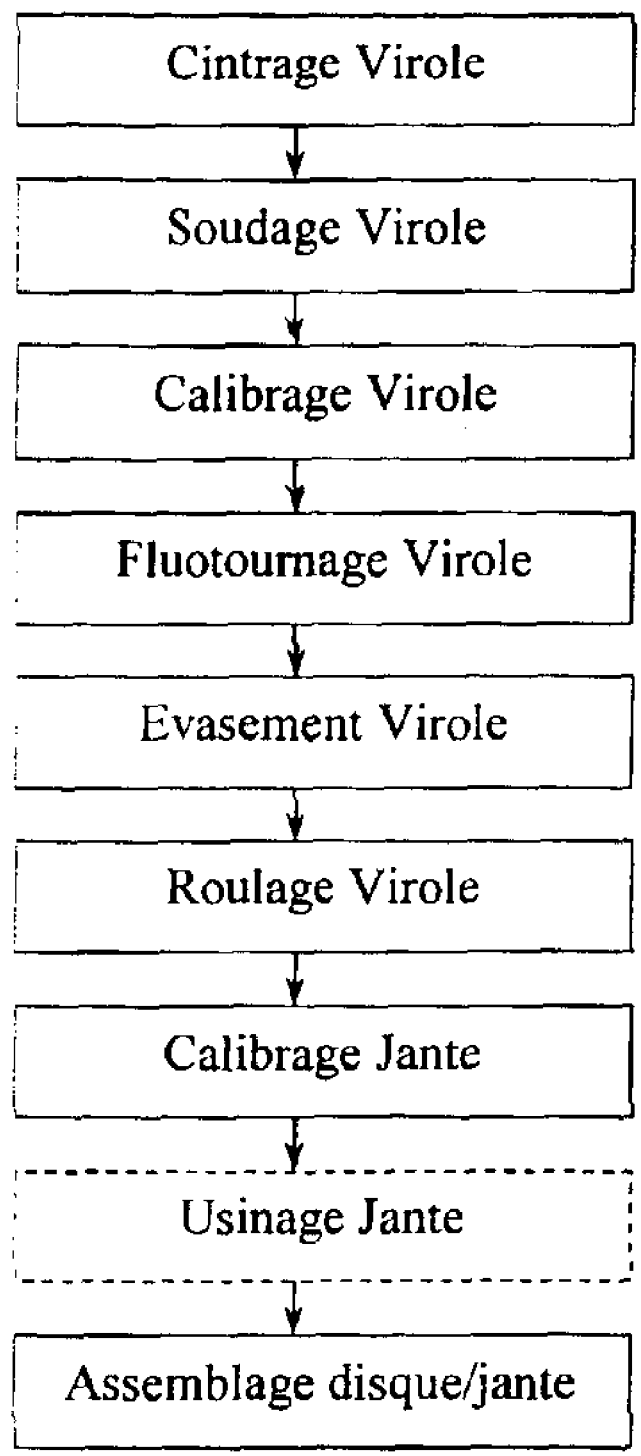
FIG. 17 is a flow chart depicting the various stages in a process for producing a wheel with assembly under the seat.
Figure 18:
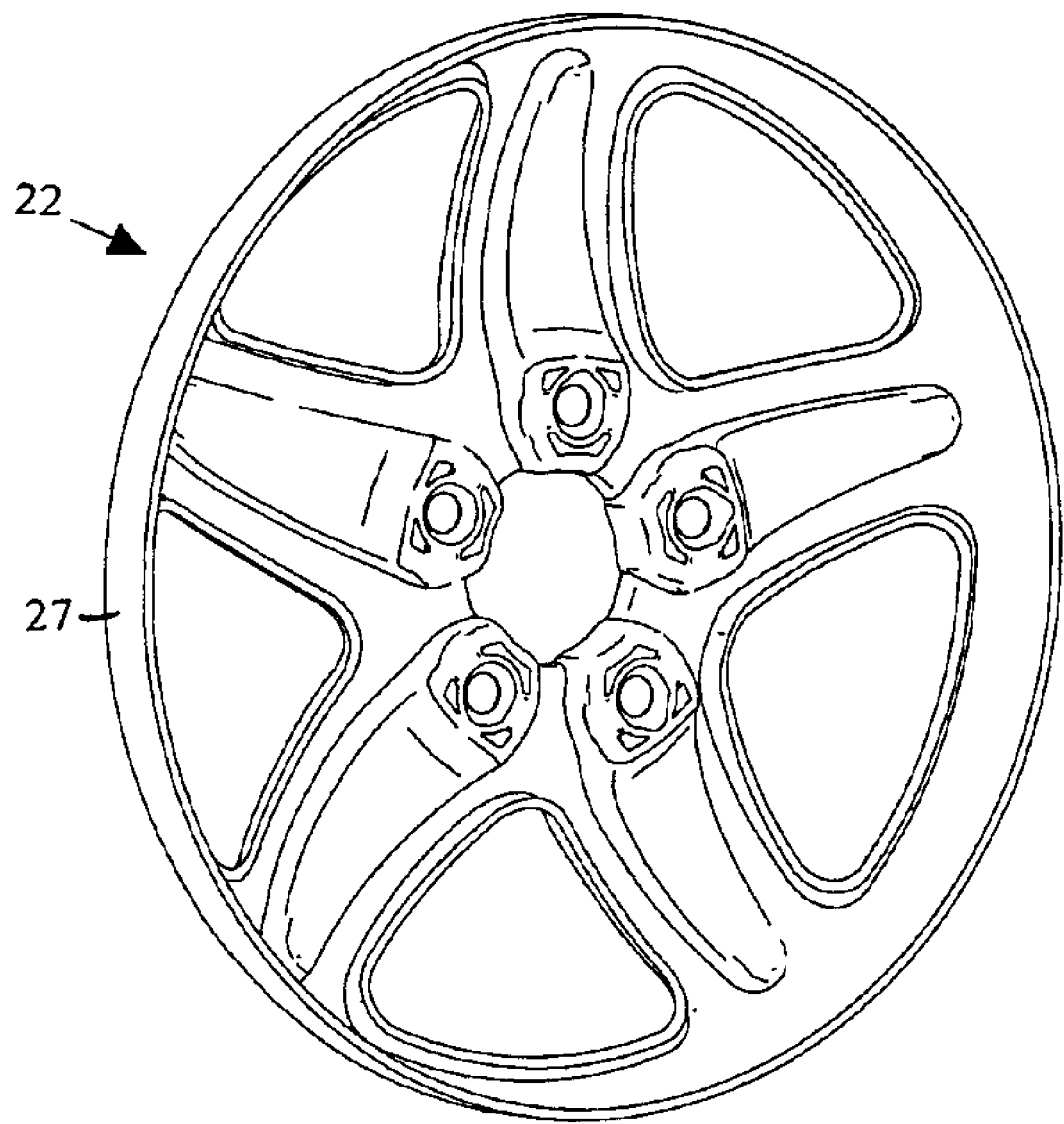
FIG. 18 is a perspective view of a wheel disc having a plurality of arms according to the invention.

An advantageous process for producing wheel rims according to the invention is illustrated in the flow chart of FIG. 17. First, a suitable metal plate (not shown), made of steel, aluminium or an alloy thereof, is bent to give it a generally cylindrical sleeve shape with two free edges. The sleeve is then welded by an arc welding, resistance welding or other method. The sleeve 70 has constant thickness (See FIG. 10). The sleeve 70 is then calibrated by expanding it with the aid of a calibration tool illustrated in FIG. 11. The expansion is obtained by moving a cam 72 which pushes apart sectors 71 around which the sleeve 70 is fitted. FIG. 12 illustrates the next stage, which consists in producing the flat profile required for the rims according to the invention, by means of cylindrical flow spinning. The flow spinning process used is inverse flow spinning. The sleeve 70 is mounted on a mandrel 81 and comes in contact with a wall 82. The mandrel 81 is then rotated and at least two rollers 83 roll over the radially outer surface of the sleeve 70 in areas where the thickness has to be reduced. The rollers 83 are moved axially in the direction of the axis X, applying a radial and tangential force such that the material flows in the direction Y opposite to the movement direction of the rollers 83. FIG. 13 illustrates schematically the sleeve 84 of variable profile obtained.

After flow spinning, the sleeve 84 undergoes one or more rolling operations intended to give the final profile of the rims according to the invention.

FIGS. 14, 15 and 16 illustrate the relation between the final profile of the axially outer portion of the rim and that of the corresponding sleeves.

FIG. 14a shows a detail of a sleeve 90 whose profile has three parts. The end 91 has a constant thickness corresponding to that of the rim flange 4 (FIG. 14b), while the portion 93 also has a constant but smaller thickness for the hump 6 and the side-wall 8 of the mounting groove; the intermediate part has variable thickness with an inclination of 5° relative to the sleeve's rotation axis. After rolling, this portion 92 will form the outer seat 5 of the rim whose radially outer wall is also inclined at 5° and whose radially inner wall is cylindrical.

FIG. 15a shows a detail of a sleeve 100 whose profile has five parts. The part 101 has constant thickness corresponding to the rim flange 4 (FIG. 15b). The part 102, whose thickness decreases inwards, corresponds to the outer rim seat 5. The part 103 corresponds to the first part 6a of a safety hump 6 whose radially inner wall remains cylindrical and whose radially outer wall is toroidal. The thickness of the portion 104 decreases and corresponds to the second part 6b of the safety hump 6 and the beginning of the side-wall 8 of the mounting groove. Finally, the part 105 has a constant thickness corresponding to that of the end of the side-wall 8 of the mounting groove. The rim 21 so obtained corresponds to that of FIGS. 2 and 3.

FIG. 16a shows a sleeve 110 whose profile has 8 parts (111 to 118). The part 116 of the profile corresponds to a cylindrical transition zone 34 of constant thickness (FIG. 16b) located between the side-wall 8 of the mounting groove and the safety hump 6. The parts 113, 114 and 115 of the profile correspond to three parts 6α, 6β and 6γ of the safety hump 6. The parts 114 and 6β have constant thickness. The rim 31 so obtained corresponds to that of FIGS. 4 and 5.

The rims so obtained are re-calibrated and fitted together with appropriate discs. Since fitting takes place between two cylindrical walls or ones that are essentially cylindrical to within the classical tolerances of industrial production, control of the tightening and off-center conditions of the rim relatively to the disc is greatly facilitated.

FIG. 15 comprises a stage of machining for the fitting zone of the rim. This stage is optional, and its purpose is to perfect the cylindrical geometry of the fitting zone in the case of sensitive assembly. In any event, this cylindrical machining is much simpler and less costly to perform than conical machining.

Although the invention has been described herein by reference to specific embodiments thereof, it will be understood that such embodiments are susceptible of modification and variation without departing from the inventive concepts disclosed. All such modifications and variations, thereof, are intended to be encompassed within the spirit and scope of the appended claims.

We claim:

1. A wheel for an automobile comprising a sheet metal rim with an outer rim flange and an inner rim flange, an outer rim seat with a radially outer frustoconical wall inclined at an angle α relative to the wheel's rotation axis, an inner rim seat, a mounting groove, and a sheet metal disc with a hub bearing surface, a radially outer edge designed for assembly with said rim, and a connection zone, wherein assembly between said rim and said disc being effected between the radially inner wall of the outer seat of said rim and the radially outer wall edge of said disc, wherein the radial thickness of the outer seat varies axially in order that the radially inner wall of said outer seat is cylindrical, and wherein the radially outer wall of said radially outer edge of said disc is cylindrical.

2. The wheel according to claim 1, in which the radially outer edge of said disc extends axially a distance essentially identical to the axial width of the outer seat of said rim.

3. The wheel according to claim 1, in which the outer seat of said rim is adjacent to a safety boss or hump, and the radially outer edge of said disc extends axially a distance essentially identical to the axial width of the outer seat of said rim increased by whole or part of the axial width of the safety hump.

4. The wheel according to claim 1, in which the rim also comprises, positioned between the outer side-wall of the mounting groove and the safety hump, a cylindrical transition zone, and the zone of contact between the disc and the rim extends axially beyond the seat, over all or part of the radially inner wall of the cylindrical transition zone.

5. The wheel according to claim 1, in which said disc is a disc of metal plate and is made by stamping.

6. The wheel according to claim 5, in which said disc is an aluminium plate.

7. The wheel according to claim 1, in which said disc and said wheel are assembled together by a process of spot welding at points arranged circumferentially at regular intervals and axially essentially in the middle of the seat.

8. The wheel according to claim 1, in which the curvature of the outer edge of the disc is orientated axially inwards.

9. The wheel according to claim 1, in which the curvature of the outer edge of the disc is oriented axially outwards.

10. The wheel according to claim 1, in which said disc comprises a hub bearing surface extended radially outwards by a plurality of arms each ending in a cylindrical outer edge designed for assembly with said rim.

11. The wheel according to claim 1, in which the thickness variation between the radially outer frustoconical wall and the radially inner cylindrical wall of the outer seat or of the part of the outer seat, is produced by a flow spinning operation.

12. The wheel according to claim 1, in which the thickness of said rim is smaller in the zone located between the outer side-wall of the mounting groove and the inner rim flange, compared with the thickness of the other parts of said rim, and in which the thickness variation is produced by cylindrical flow spinning operations.

13. The wheel according to claim 1, in which the angle of inclination $\alpha$ is 5°.

14. A "full-face" wheel for an automobile, comprising a sheet metal rim having, axially from the inside outwards, an inner rim flange, an inner seat, a mounting groove and at least part of an outer rim seat with a radially outer frustoconical inclined at an angle $\alpha$ relative to the rotation axis of the wheel, a disc with a hub bearing surface, a transition zone ending radially in an outer rim flange, and a shoulder extending axially inwards whose radially outer wall is designed to constitute, together with the radially inner wall of the outer end of the outer rim seat, the assembly zone of said disc with said rim, wherein the radial thickness of at least part of said outer rim seat varies axially in order that the radially inner wall of said at least part of said outer rim seat is cylindrical, and wherein the radially outer wall of said shoulder of the disc is cylindrical.

15. The wheel according to claim 14, in which the thickness variation between the radially outer frustoconical wall and the radially inner cylindrical wall of the outer seat or of the part of the outer seat, is produced by a flow spinning operation.

16. The wheel according to claim 14, in which the thickness of said rim is smaller in the zone located between the outer side-wall of the mounting groove and the inner rim flange, compared with the thickness of the other parts of said rim, and in which the thickness variation is produced by cylindrical flow spinning operations.

17. The wheel according to claim 14, in which the angle of inclination $\alpha$ is 5°.

18. A wheel for an automobile comprising a sheet metal rim with an outer rim flange and an inner rim flange, an outer rim seat with a radially outer frustoconical wall inclined at an angle $\alpha$ relative to the wheel's rotation axis, an inner rim seat, a mounting groove, and a sheet metal disc with a hub bearing surface, a radially outer edge designed for assembly with said rim, and a connection zone, assembly between said rim and said disc being effected between the radially inner wall of the outer seat of said rim and the radially outer wall edge of said disc, characterized in that the radially outer edge of said disc is cylindrical and the radially inner wall of the outer seat of said rim is also cylindrical, the rim also comprising, positioned between the outer side-wall of the mounting groove and the safety hump, a cylindrical transition zone, and the zone of contact between the disc and the rim extends axially beyond the seat, over all or part of the radially inner wall of the cylindrical transition zone.

19. A wheel for an automobile comprising a sheet metal rim with an outer rim flange and an inner rim flange, an outer rim seat with a radially outer frustoconical wall inclined at an angle $\alpha$ relative to the wheel's rotation axis, an inner rim seat, a mounting groove, and a sheet metal disc with a hub bearing surface, a radially outer edge designed for assembly with said rim, and a connection zone, assembly between said rim and said disc being effected between the radially inner wall of the outer seat of said rim and the radially outer wall edge of said disc, characterized in that the radially outer edge of said disc is cylindrical and the radially inner wall of the outer seat of said rim is also cylindrical, said disc and said wheel being assembled together by a process of spot welding at points arranged circumferentially at regular intervals and axially essentially in the middle of the seat.

20. A wheel for an automobile comprising a sheet metal rim with an outer rim flange and an inner rim flange, an outer rim seat with a radially outer frustoconical wall inclined at an angle $\alpha$ relative to the wheel's rotation axis, an inner rim seat, a mounting groove, and a sheet metal disc with a hub bearing surface, a radially outer edge designed for assembly with said rim, and a connection zone, assembly between said rim and said disc being effected between the radially inner wall of the outer seat of said rim and the radially outer wall edge of said disc, characterized in that the radially outer edge of said disc is cylindrical and the radially inner wall of the outer seat of said rim is also cylindrical, wherein the curvature of the outer edge of the disc being oriented axially outwards.

21. A wheel for an automobile comprising a sheet metal rim with an outer rim flange and an inner rim flange, an outer rim seat with a radially outer frustoconical wall inclined at an angle $\alpha$ relative to the wheel's rotation axis, an inner rim seat, a mounting groove, and a sheet metal disc with a hub bearing surface, a radially outer edge designed for assembly with said rim, and a connection zone, assembly between said rim and said disc being effected between the radially inner wall of the outer seat of said rim and the radially outer wall edge of said disc, characterized in that the radially outer edge of said disc is cylindrical and the radially inner wall of the outer seat of said rim is also cylindrical, wherein said disc comprising a hub bearing surface extended radially outwards by a plurality of arms each ending in a cylindrical outer edge designed for assembly with said rim.

* * * * *